Dec. 9, 1947.   J. D. MORGAN ET AL   2,432,168
DIESEL ENGINE TESTING APPARATUS
Filed March 30, 1943   3 Sheets-Sheet 1

INVENTORS
JOHN D. MORGAN
PERCY B. LEVITT
BY Edmund G. Borden
ATTORNEY

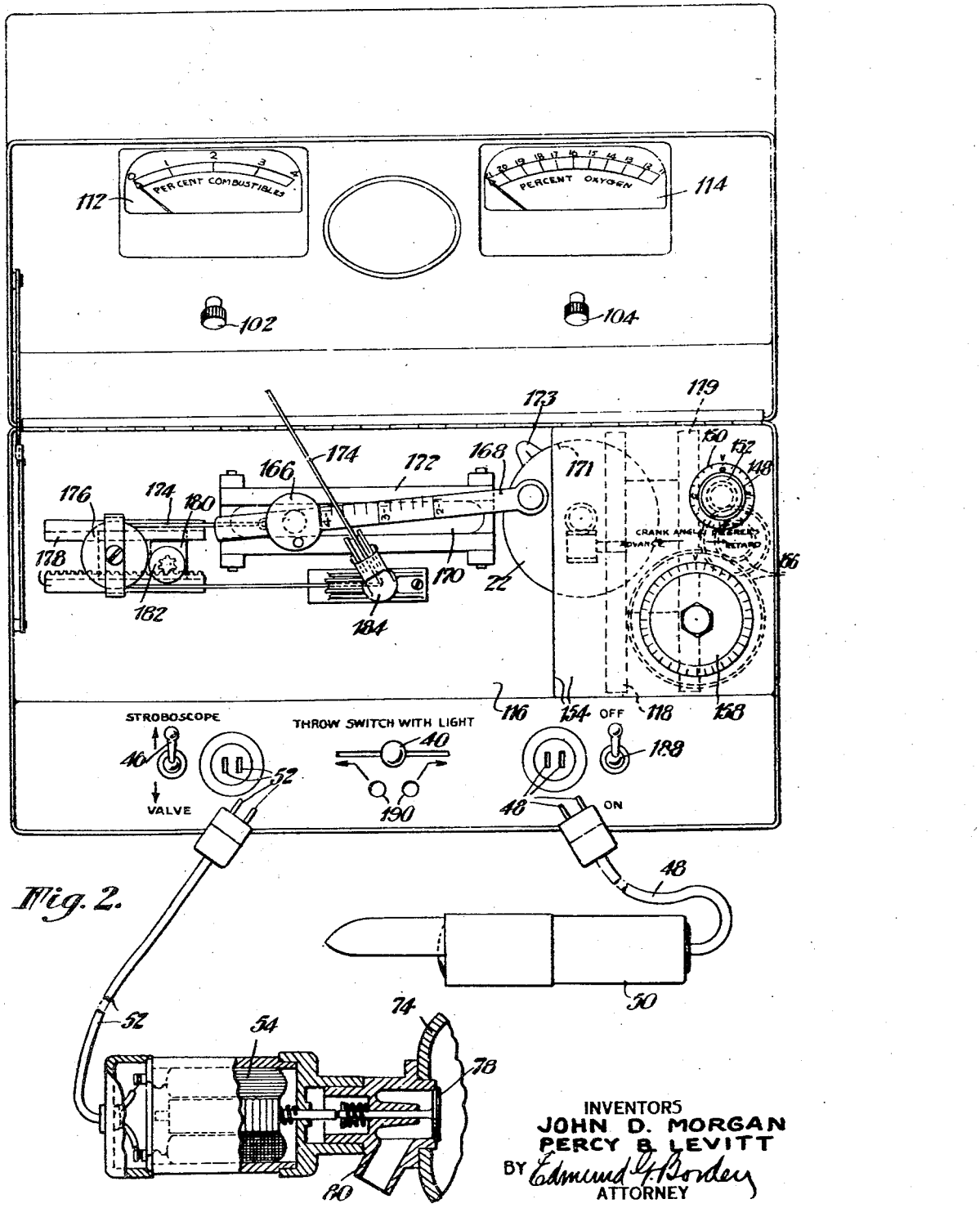

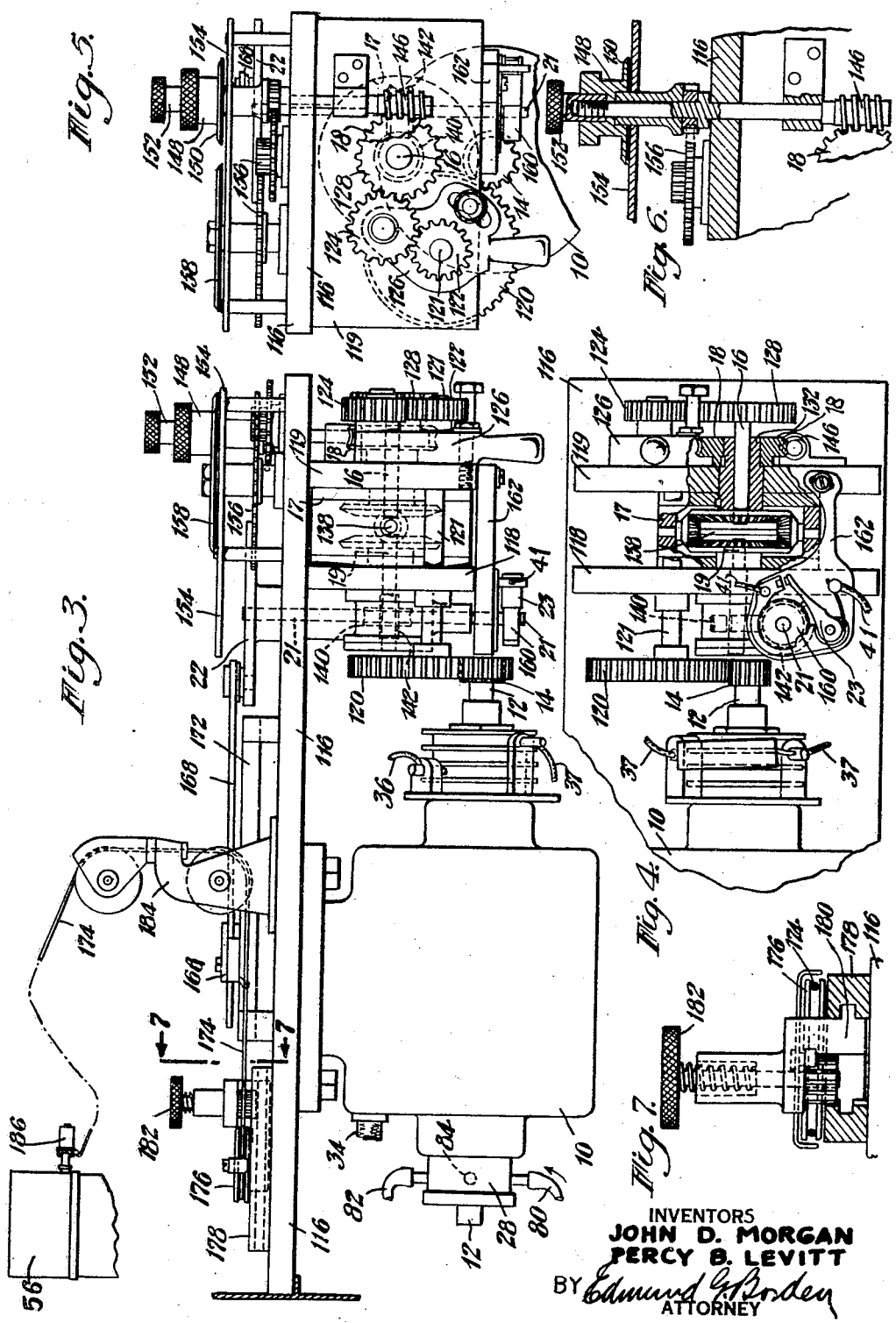

Patented Dec. 9, 1947

2,432,168

UNITED STATES PATENT OFFICE 2,432,168

DIESEL ENGINE TESTING APPARATUS

John D. Morgan, South Orange, and Percy B. Levitt, Millburn, N. J., assignors to Cities Service Oil Company, New York, N. Y., a corporation of Pennsylvania Application March 30, 1943, Serial No. 481,106

7 Claims. (Cl. 73—116)

This invention relates to apparatus for analyzing the operation of and testing Diesel engines.

More particularly the invention relates to a portable apparatus for analyzing the operation of two-cycle Diesel engines, such for example as those directly connected to alternators. The apparatus makes it possible to take indicator cards of any phase relation to crank pins, and furthermore includes a means for taking a gas sample from the engine cylinders at the commencement of exhaust and prior to the admixture of scavenging air. The apparatus also includes means for indicating directly the percentage of oxygen and combustibles present in the exhaust gas sample taken. A very complete diagnosis of the engine can be made with the information obtainable by means of the apparatus of the present invention, to indicate the operation of the engine so that operation defects and characteristics may be detected and studied.

The taking of a gas sample from a two-cycle Diesel engine is complicated by the fact that scavenging air is admitted to the cylinder soon after the exhaust commences. Therefore, a sample taken in the usual way would not be a true sample of the exhaust gas of the engine, but would be one diluted with scavenging air. The problem of taking the gas sample has been solved in the present instance by providing an apparatus which includes a timing and valve mechanism for taking the exhaust gas sample before it is mixed with scavenging air.

The timing mechanism of the apparatus of the present invention is also used for making the indicator cards. In the past, it has been the general practice to make indicator cards by taking indicator motion from various parts of the engine, such as the piston, cross-head, etc. Most of the modern engines are enclosed so that such connections are not conveniently usable. Indicator cards may be made by the use of the apparatus of the present invention without having any direct connection with the moving parts of the engine itself.

The primary object of the present invention is to provide an improved portable testing apparatus by which the operation of Diesel engines may be analyzed to thereby indicate ways of improving the engine efficiency.

A further object of the invention is to provide an improved testing apparatus particularly adapted for the testing of two-cycle Diesel engines.

A still further object of the invention is to provide an improved apparatus for taking and analyzing the exhaust gas from the cylinders of two-cycle Diesel engines.

Another object of the invention is to provide an improved apparatus for operating engine indicators.

Another object of the invention is to provide improved testing apparatus which may be synchronized and phased with a two-cycle Diesel engine and by which indicator cards may be made and exhaust gases obtained and analyzed.

The apparatus of the present invention will be described in connection with the accompanying drawings forming a part of this application and in which:

Fig. 2 is a top view of the instrument case (opened) for the testing apparatus illustrated in Figure 1 showing the portions of the apparatus which are visible and attached portions, part of which is in broken section.

Fig. 3 is a vertical side elevational view of a portion of the instrument shown in Fig. 2.

Fig. 4 is a view of a portion of the driving mechanism of the apparatus shown in Fig. 3, looking from below, with parts broken away.

Fig. 5 is an end view of the apparatus shown in Fig. 3 looking from the right, with parts broken away.

Figure 1:
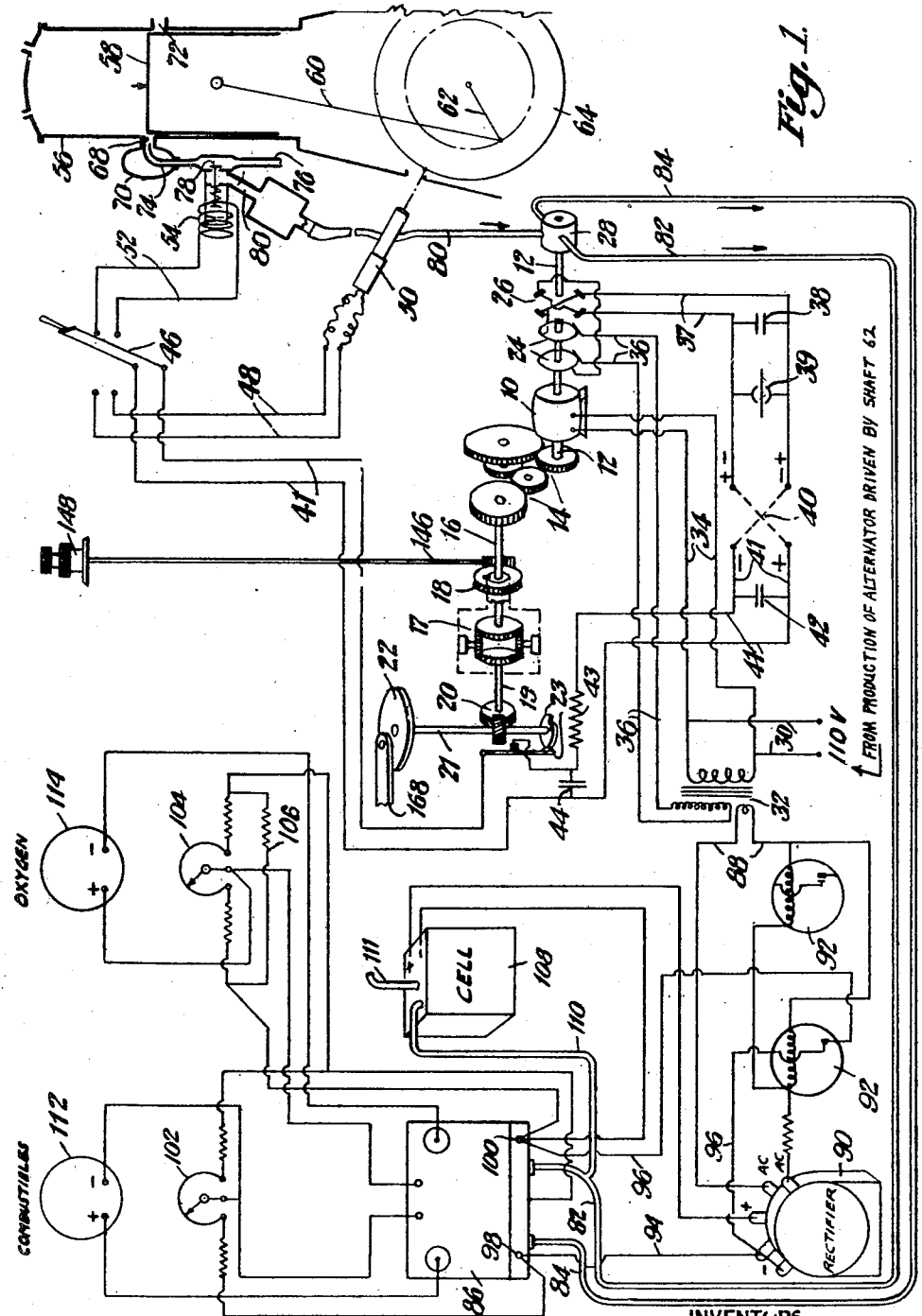
Fig. 1 is a diagrammatic showing of the improved testing apparatus particularly illustrating the means for taking and analyzing exhaust gases from a cylinder of a two-cycle Diesel engine.

Fig. 6 is an enlarged vertical sectional view similar to that of Fig. 5 showing a portion of differential gear mechanism of the apparatus of Figs. 3, 4 and 5; and Fig. 7 is an enlarged view partly in section of a portion of a takeup device of the apparatus shown in Figs. 2 and 3, taken on the line 7—7 of Fig. 3.

The testing apparatus of the present invention as shown diagrammatically in Fig. 1 includes a synchronous motor 10 which for example operates at a speed of 1800 R. P. M. The motor 10 has a shaft 12 which terminates at one end in a gear train 14 by which the speed may be reduced for example to 360 R. P. M. on a connecting shaft 16 which is the speed of the engine to be tested. The gear train 14 includes a gear-changing arrangement by which any rotational speed from 120 to 360 R. P. M. may be obtained for the connecting shaft 16, by the choice of suitable gears. The shaft 16 terminates in a gearing arrangement shown generally at 17, including a differential gear which is adjustable by means of a hand knob and a gear wheel 18 riding on the shaft 16. An outlet shaft 19 from the gear 17 terminates in a gear 20 which operates a shaft 21 having a crank disk 22 at its top and a contact maker 23 at its lower end.

The motor shaft 12 has mounted thereon a pair of collector rings 24, a four-part commutator 26 and a pump 28, the pump being used for drawing exhaust gases from the Diesel engine under test and forcing them to the analyzer for the determination of oxygen and combustibles.

Current, 110 A. C., is supplied to the apparatus from a circuit directly or electrically connected to an alternator driven by the Diesel engine under test. The current is supplied to the apparatus shown in Fig. 1 through leads 30 which connect directly into the motor 10 and into a transformer 32 by means of connecting lead wires 34. Alternating current approximately 450 volts is supplied from a transformer 32 to the collector rings 24 by lead lines 36. Any other voltage may be used which would be suitable for operating a stroboscopic lamp. The rectified current from a commutator 26 discharges through lead lines 37 to which is connected a twin electrode neon lamp 39, a 0.5 microfarad condenser 38 to keep an electrode of the lamp 39 glowing, and a crossover switch 40. This switch 40 connects to lead wires 41, one of which includes the contact maker 23. The lead lines 41 also connect into a 120 microfarad tank condenser 42, a charging resistance 43 and a condenser 44 of about 30 microfarads. The lead wires 41 terminate in a switch 46 through which they may be connected through lead lines 48 with a stroboscopic lamp 50, or through lines 52 with an electro-magnet 54 for opening a gas sampler valve.

The lead lines 41 to the left of the cross-over switch 40 must have the plus and minus (polarity) characteristics indicated, whereas the current from the commutator 26 might produce a reverse polarity in the lead lines 37. The cross-over switch is therefore used to provide the proper plus and minus current for the respective wires 41. The twin electrode neon lamp 39 is arranged in such a way that only the electrode connected to the plus lead wire 37 will glow, and the switch 40 is arranged so that all that is necessary to get current of proper polarity is to slide the switch in the direction of the glowing electrode, as indicated in Fig. 2 of the drawings.

The procedure and method of taking an exhaust gas sample from a cylinder of a Diesel engine is illustrated in Fig. 1 in which is shown a Diesel engine cylinder 56 provided with a piston 58 which has a connecting rod 60 connected to a crank shaft 62 having thereon a flywheel 64. The crank shaft 62 is connected to and drives an alternator, not shown. The cylinder 56 is provided with the usual exhaust port or ports 68 which discharge into an exhaust gas manifold 70, and a scavenging air port or ports 72. The exhaust gas sample is taken directly in the exhaust port 68 by inserting a sampling tube 74 thereinto through any suitable opening such as a thermocouple hole in the exhaust gas manifold 70. The sampling tube 74 as shown is arranged to take the direct blast of exhaust gas in the port 68 as soon as this port opens. The sampling tube 74 is furthermore provided with an outlet open to the atmosphere at 76 and intermediately with a valve 78 (normally kept in closed position by a spring), opened automatically by the electro-magnet 54. The tube 74 is preferably of uniform size to avoid gas pockets.

When it is desired to take a sample of the engine cylinder exhaust, the switch 46 is closed to operate the electro-magnet 54, this operation being previously timed to occur an instant after the exhaust port 68 opens. The blast through the sampling tube has to dispel the residual gas through the outlet 76 before a true sample is obtainable. The point desired for the opening of the valve 78 is one corresponding to the lowest oxygen content or an instant after the port 68 is opened and before the port 72 is opened. The procedure for accurately adjusting the timing for the taking of the gas sample is described more in detail hereinafter. A gas sample is taken by suction through the valve 78 by the pump 28 which is connected to the valve outlet by a tube 80 containing an enlarged surge chamber as shown to increase the gas flow. At the pump 28, the exhaust gas is discharged through two tubes 82 and 84 which lead respectively to separate analyzers for oxygen and combustibles mounted in a housing 86. The detailed construction and operation of the analyzers is unnecessary since the preferred analyzer is shown for example in Patent No. 2,273,981, of which one of the present applicants is a joint patentee.

Each of the analyzers in the housing 86 is of the Wheatstone bridge type in which a catalytic electric heating element forms one leg of the bridge. Electricity for these catalytic heating elements is taken from the transformer 32 through lead wires 88 to a rectifier 90, one of the lead wires 88 being connected through parallel ballast lamps 92, such as amperites, which are adapted to maintain a constant voltage in the circuit to the analyzer 86. Rectified D. C. current is supplied from the rectifier 90 through lead wires 94 and 96 to connector points 98 and 100 of the respective analyzer bridges in the housing 86, the lead wire 96 being connected through one of the amperites 92. The electric currents flowing through the Wheatstone bridges of the analyzer are controlled respectively by zero adjuster rheostats 102 and 104 which are connected by shunt circuits across the heating legs of the bridges. The rheostat 104 is provided with a calibrating resistance 106.

In operating the analyzer apparatus for determining combustibles and excess oxygen in the engine exhaust gases, hydrogen for using up the free oxygen in the sample in line 82 is taken from a hydrogen cell 108 through a line 110 and thoroughly mixed with the engine exhaust gases in the line 82. The oxygen produced by the cell 108 is discharged through a pipe 111. Direct current for the hydrogen cell 108 is taken from the rectifier 90 in the manner indicated by the wiring. Outside air is not needed in line 84, because there is sufficient excess free oxygen in the engine exhaust. The percentages of combustible and free oxygen in the engine exhaust gases may be read directly on millivoltmeters 112 and 114 respectively which are connected across the electric heating elements of the respective Wheatstone bridges in the housing 86. The calibrations for the elements 112 and 114 are shown in Fig. 2, in the opened position of the cover section of the instrument case. Fig. 2 also shows a number of the other elements of the apparatus of Fig. 1 and the other figures of the drawings, and the general arrangement of the apparatus in the instrument case.

The structure and method of mounting the motorized equipment described above is shown in substantial detail in Figs. 3 to 7. In Figs. 3 to 5, the motor 10 is shown as mounted on the underside of a horizontal panel 116 which is set in the main section of the instrument case. The gear mechanism referred to above is also mounted on the underside of the panel 116 by a pair of spaced supports 118 and 119. The small gear wheel on the motor shaft 12 meshes with a large gear wheel 120, from which a shaft 121 extends through the supports 118 and 119 and terminates in a gear wheel 122 fixed to the shaft, this wheel in turn meshing with a gear wheel 124 which is mounted on a base 126 pivoted on the shaft 121 behind the gear wheel 122. This base is provided with a handle and a slot and locking bolt as shown in Fig. 5. The gear wheel 124 also meshes with a removable gear wheel 128 mounted on the shaft 16. The gear wheel 120 and the small wheel on the motor shaft gives a 5 to 1 speed reduction. The size of the gear wheels 122, 124 and 128 are selected so that any rotational speed from 120 to 360 R. P. M. may be obtained for the shaft 16. These gear wheels are so arranged that the gear 128 may have and preferably does have the same number of teeth as the number of poles in the alternator. This arangement facilitates the determination of the teeth and sizes for the gear wheels to give an R. P. M. for the shaft 21 equal to that of the R. P. M. of the Diesel engine crank shaft under test. The pivoted base 126 permits the use of a gear wheel 128 of any predetermined size, since the wheel 124 may be swung toward or away from the shaft 16 to accommodate the selected gear wheel 128.

The shaft 16 is mounted in and extends through a movable hub 132 (Fig. 4) which in turn is mounted in the support 119. The shaft 16 terminates in the differential gear 17 which is mounted between the supports 118 and 119 and which is keyed to the hub 132. The differential gear comprises a large driven bevel gear wheel fixed to the end of the shaft 16, which faces a similar gear wheel mounted on the shaft 19. The shaft 19 has a bearing in the support 118. As shown more particularly in Fig. 4, the differential gear also includes a pair of spaced bevel pinions operating between the large bevel gear wheels, and mounted for rotation on a shaft 138, the ends of which extend into the differential gear casing. A gear wheel 140 mounted on the driven shaft 19 outside the support 118 and in a gear box, meshes with a gear wheel 142 on the shaft 21 for angle drive, these gears being arranged to give a ratio of 1 to 1 from the shaft 19 to the shaft 21. The differential gear 17 may be positioned as desired by rotating the hub 132 which is keyed to a gear wheel 18, which in turn is arranged for angle drive by a worm geared shaft 146 as shown more in detail in Figs. 5 and 6.

The position of the differential gear 17 is important in the operation of the apparatus because through this mechanism the circuit maker 23 may be synchronized with the Diesel engine under test, and the timing adjusted for the opening of the valve 78. The differential gear may be rotated through 360° by means of the shaft 146 which extends through the panel 116 and terminates in a knurled dial head or hand knob 148 having a calibrated scale 150. The dial head 148 may be set and locked in any desired position by means of a knurled nut 152. The dial head 148 is set above a panel 154 which is raised with respect to the panel 116 over the right end of the panel 116 as shown in Figs. 2 and 3. The shaft 146 is also geared through a gear train 156 mounted between the panels 116 and 154, to a dial 158 mounted above the panel 154 and calibrated in degrees. The dials 150 and 158 are rotated with respect to zero points indicated on the panel 154 (Fig. 2). The rotation of the dial 158 one complete revolution, by hand knob 148, also rotates crank disc 22 one complete revolution, if the shaft 16 is not moved.

The contact maker 23 is associated with the lower end of the shaft 21 (Figs. 1, 3 to 5), and comprises a plain wheel 160 having a notch in its circumference which permits the closing of a contact in one of the lead wires 41 with every revolution of the wheel. The wheel 160 normally holds the bearing pin and spring arm shown in Fig. 4 in a position to keep the lead line 41 open. The spring arm and contact points are mounted on a base 162 fastened to the lower edges of the supports 118 and 119, above the wheel 160. The base 162 is capable of a limited rotational adjustment about the shaft 21 for changing the relative positions of the notch in the wheel 160 and the bearing pin on the spring arm, so that the contact occurs at a definite position for the crank disc 22.

The shaft 21 extends through the panel 116 and the crank disc 22 is attached to its upper end. The rotation of this disc by the shaft 21 drives a cross-head 166 by means of graduated connecting rod 168 which is made adjustable so that the ratio of the crank radius to the connecting rod length can be made equal to that of the corresponding parts of the Diesel engine under test. The cross-head 166 is slotted to receive the connecting rod and is provided with a set screw as shown in Fig. 2 for locking the cross-head onto the connecting rod at the proper length. The cross-head is also connected to a slide 170 which reciprocates in a guide 172 mounted at the top of the panel 116, as shown in detail in Fig. 2 of the drawings. The crank disc 22 is provided with a mark 171 which serves as a reference point to be matched with a mark 173 on the panel 116. When these marks match, the slide 170 is at top dead-center, corresponding to the same point in the engine piston cycle.

An indicator cord 174 is attached directly to the cross-head 166 and taken around a sheave 176 on a take-up device including a pair of guides 178 (one of which includes a rack), a movable slide member 180 to which the sheave 176 is attached, and to which is also attached a pinion, operable by a spring tensioned hand knob 182. The cord after passing around the sheave 176 then passes through a sheaved fair lead 184 from which it may extend to an indicator drum 186 (Fig. 3) of whatever engine indicator is being used. The drum 186 may be any of the well known engine indicator drums and is preferably mounted on the side of an engine to be tested as shown in Fig. 3. The mounting is such that the pressure gases from within the cylinder will impart a longitudinal movement to the usual recording pencil on the drum while the cross-head 166 and cord 174 impart a rotary motion to the drum. The length of the indicator cord 174 may be adjusted to bring the drum and the indicator cord thereon to the desired position, this adjustment being made by operating the hand wheel 182 to move the slide 180 in the desired direction from the cross-head 166. With the indicator cord connected to the indicator drum and the apparatus in operation, it will be apparent that the drum 186 will be oscillated in synchronism with the motion of the engine piston of the engine cylinder under test.

The Diesel testing apparatus of the present invention is very compact and readily taken to the Diesel generator plants to carry out the tests, since the case shown in Fig. 2, in which the apparatus is mounted, is only as large as a medium sized suit case. To begin with, the instrument is plugged into a 110 volt A. C. current supply made by the alternator connected to the engine under test, by an extension cord, not shown, and the current turned on by a switch 188 (Fig. 2). With the apparatus in operation, the rectified current from the commutator 26 lights one side of neon lamp 39 mounted under the openings 180 (Fig. 2), and the switch 46 is shifted in the direction of whichever light is showing. Current of proper polarity is necessary to operate the lamp 50 and the electromagnet 54.

The instrument is further adjusted or phased with any desired point in the engine piston cycle, as for example, top dead-center of the piston of the cylinder under test, by rotating the differential gear with the positioning knob 148, as explained above. The contact maker 28 should be checked to see that the contact occurs when marks 171 and 173 are opposite each other. Plate 162 (Fig. 4) may be adjusted to get this result. The taking of data for the various cylinders and for different positions of the piston of each cylinder is greatly facilitated by setting the dial 158 at zero when the marks 171 and 173 are opposite. This is accomplished by releasing the locking knob 152 and rotating the dials 150 and 158 without rotating shaft 146. The detailed structure shown in Fig. 6 is provided to permit the release of the dials from the shaft 146 for setting, and the locking of them to the shaft by means of the locking knob 152 which forces the dial knob 148 and connecting sleeve and small gear against a shoulder on the shaft 146 immediately above the panel 116. Now if the firing order of the engine cylinders is known, top dead-center for the piston of any cylinder can be read off the positioning dial since of course the crank shaft angles of any particular engine are known. The taking of indicator diagrams for all of the engine pistons may be accomplished merely by setting the dial to the desired position for each cylinder. The phase relationship can be changed so that an indicator diagram can also be taken 90° ahead or after the crank pin (advance or retard), or at any other phase displacement desired for any or all pistons. The stroboscope 50 may be used on the disc 22 and the engine in checking the instrument to see that it is correctly phased with an engine piston cycle, by merely throwing the switch 46 and lighting the flywheel of the engine so that a point thereon corresponding to top dead-center can be compared with the corresponding point on the disc 22.

The exhaust gases of the cylinder of the two-cycle Diesel engine under test may be taken by throwing the switch 46 to operate the valve 78, so that the combustion gas sample is taken and conducted to the analyzer 86. The valve 78 is a very quick-acting valve and opens and closes in approximately 1/750 second. This rapidity of opening of the valve permits the sample to be taken through from 1 to 3 crank shaft degrees, depending upon the speed of the engine. The timing of the valve is adjusted, as explained above, by the positioning knob 148, to occur at the precise moment the exhaust port opens, or slightly thereafter.

The improved testing instrument of the present invention provides an advantageous means by which indicator cards may be taken and the percentages of oxygen and combustibles in the two-cycle Diesel engine exhaust gases may be known, and thus provide information sufficient for a very complete diagnosis of its various individual cylinders, so that suitable measures may be taken for improving the engine's efficiency. Other piston-driven engines such as steam engines and other Diesel and internal combustion engines may be analyzed by the apparatus of the present invention by taking indicator cards for determination of their horsepower and other characteristics. The improved apparatus is used with present indicators having the usual pressure connections to engine cylinders. The apparatus may be used for obtaining data which will aid in the adjustment of the main valves of such engines as well as injection valves and the timing of the engine mechanism. Furthermore, the apparatus may be used as an aid in adjusting and equalizing the compressions of the different cylinders of the engine.

The synchronous motor 10 is powered by current produced by the alternator driven by the engine under test, unless some other means is provided for keeping the testing apparatus in phase with the engine. The speed of the motor 10 may be the same as, or higher than, that of the engine under test, and suitable gearing employed such as that described in the above example for obtaining the proper speed for the contact maker and crank disc. Instead of using the differential gear for phasing the crank disc and circuit maker with the engine under test, some other equivalent apparatus may be employed. Instead of phasing the apparatus with a point on the flywheel a point on another rotating part of the engine or alternator may be used. Other changes and other means equivalent to various parts of the apparatus may be used in place of the specific parts described above, without departing from the invention.

While the testing apparatus of the present invention has been described in substantial detail, it will be apparent to those skilled in the art that various changes in structure and functioning of different parts may be made. Such changes however are contemplated as coming within the scope of this invention, as defined by the appended claims.

Having described the invention in its preferred form, what is claimed as new is:

1. An apparatus for analyzing the operation of a Diesel engine which comprises an exhaust gas sampler including an electro-magnetically-operated valve through which the sample is drawn, an electric motor operable at a substantially higher speed than the Diesel engine being analyzed, a speed-reducing means connected with the shaft of said motor and to a rotary circuit maker, said speed-reducing means being arranged to provide a speed for the circuit maker equal to that of the speed of the Diesel engine being analyzed, an electric circuit for operating the electromagnet of said valve, said circuit maker being included in said electric circuit, means connected with said rotary circuit maker for providing a reciprocating motion for operating the drum of an engine indicator, and means for phasing said reciprocating means and said circuit maker with the piston motion of the engine cylinder under test whereby said electro-magnetically-operated valve may be opened at the desired point in the engine cylinder cycle to obtain an exhaust gas sample for analyses, and whereby an indicator diagram of the engine cylinder under test may be taken.

2. An apparatus for analyzing the operation of a Diesel engine, which comprises an exhaust gas sampler including an electro-magnetically-operated valve through which the sample is drawn, an electric motor operable at a constant speed, a speed-adjusting means connected with the shaft of said motor and to a rotary circuit maker, said speed-adjusting means being arranged to provide a speed for the circuit maker the same as that of the speed of the Diesel engine to be analyzed, an electric circuit for operating the electro-magnet of said valve including said circuit maker, means connected with said rotary circuit maker for providing a reciprocating motion for operating the drum of an engine indicator, and means for phasing said reciprocating means and said circuit maker with the piston motion of the engine cylinder under test whereby said electro-magnetically-operated valve may be opened at the desired point in the engine cylinder cycle to obtain an exhaust gas sample for analyses, and whereby an indicator diagram of the engine cylinder under test may be taken.

3. An apparatus for analyzing the operation of a two-cycle Diesel engine connected to an alternator, which comprises an exhaust gas sampler for insertion into the exhaust port of the engine cylinder including an electro-magnetically-operated valve through which the sample is drawn, an electric motor operable at a substantially constant speed on current from said alternator, a speed-adjusting means connected with the shaft of said motor and a rotary circuit maker, said speed-adjusting means being arranged to provide a speed for the circuit maker the same as that of the speed of the Diesel engine to be analyzed, an electric circuit for operating the electro-magnet of said valve including said circuit maker, means connected with said rotary circuit maker for providing a reciprocating motion for operating the drum of an engine indicator, and means for phasing said reciprocating means and said circuit maker with the piston motion of the engine cylinder under test whereby said electro-magnetically-operated valve may be opened at the desired point in the engine cylinder cycle to obtain an exhaust gas sample for analyses, and whereby an indicator diagram of the engine cylinder under test may be taken.

4. An apparatus for analyzing the operation of a two-cycle Diesel engine, which comprises an exhaust gas sampler including an electro-magnetically-operated valve through which an exhaust gas sample is drawn from the exhaust gas port of the Diesel engine cylinder being analyzed, an electric motor operable at a substantially constant speed, a speed-adjusting gear train connected with the shaft of said motor and arranged to provide a speed which is the same as the speed of the engine under test, a shaft rotated by said gear train at the Diesel engine speed, said shaft including an electric circuit maker in an electric circuit connected to said electro-magnet, said shaft also being connected to drive a reciprocating member in synchronism with the piston of the engine cylinder being tested, and means for phasing said circuit maker and said reciprocating means with the engine cylinder under test.

5. An apparatus for analyzing the operation of a two-cycle Diesel engine, which comprises an exhaust gas sampler including an electro-magnetically-operated valve through which an exhaust gas sample is drawn from the exhaust gas port of the Diesel engine cylinder being analyzed, an electric circuit for the electro-magnet of said valve, an electric motor operable at a substantially constant speed, a speed-adjusting gear train connected with the shaft of said motor and arranged to provide a speed which is the same as the speed of the engine under test, a shaft rotated by said gear train at the Diesel engine speed, an electric circuit maker in said electric circuit operated from said shaft, said shaft also being operatively connected to drive a reciprocating member in synchronism with the piston of the engine cylinder being tested, and means including a differential gear for phasing said circuit maker and said reciprocating means with the engine cylinder under test.

6. An apparatus as defined by claim 5 in which hand operative means is provided for rotating said differential gear, and thereby rotating said shaft relative to said motor.

7. An apparatus for analyzing the operation of a two-cycle Diesel engine connected to an alternator, which comprises an exhaust gas sampler including an electromagnetically-operated valve through which an exhaust gas sample is drawn from the exhaust gas port of the Diesel engine cylinder being analyzed, an electric circuit for the electro-magnet of said valve, an electric motor receiving current from said alternator operable at a substantially constant speed, means for supplying electric current to collector rings mounted on the shaft of said motor, a commutator on said shaft receiving current from said collector rings, means for supplying current from said commutator to said circuit for said electromagnet, a speed-adjusting gear train connected with the shaft of said motor and with a driven shaft and arranged to provide a speed for said driven shaft which is the same as the speed of the engine under test, an electric circuit maker in said electric circuit operated by said driven shaft, said shaft also being operatively connected to drive a reciprocating member in synchronism with the piston of the engine cylinder being tested, means for phasing said driven shaft with the engine cylinder under test, means for analyzing the exhaust gas from the engine cylinder for its content of free-oxygen and combustibles, a stroboscopic lamp for checking the timing of said driven shaft against that of the engine piston of the cylinder under test, and means for supplying electric current from said electric circuit to said stroboscopic lamp.

JOHN D. MORGAN.
PERCY B. LEVITT.

REFERENCES CITED

The following references are of record in the file of this patent:

UNITED STATES PATENTS

| Number | Name | Date |
|---|---|---|
| 1,781,013 | Jacklin et al. | Nov. 11, 1930 |
| 2,077,538 | Wait | Apr. 20, 1937 |
| 2,192,863 | Hetzel et al. | Mar. 5, 1940 |
| 2,236,422 | Boley | Mar. 25, 1941 |
| 1,890,601 | Cox | Dec. 13, 1932 |
| 2,259,615 | Chappell | Oct. 21, 1941 |
| 2,261,655 | Lowe | Nov. 4, 1941 |